United States Patent
Lasaruk et al.

(10) Patent No.: US 12,015,840 B2
(45) Date of Patent: Jun. 18, 2024

(54) SYNCHRONIZED CAMERA SYSTEM HAVING TWO DIFFERENT CAMERAS

(71) Applicant: Conti Temic microelectronic GmbH, Nuremberg (DE)

(72) Inventors: Aless Lasaruk, Lindau (DE); Reik Müller, Oberreitnau (DE); Simon Hachfeld, Lindau (DE); Dieter Krökel, Eriskirch (DE); Stefan Heinrich, Achern (DE)

(73) Assignee: CONTI TEMIC MICROELECTRONIC GMBH, Nuremberg (DE)

( * ) Notice: Subject to any disclaimer, the term of this patent is extended or adjusted under 35 U.S.C. 154(b) by 246 days.

(21) Appl. No.: 17/309,807

(22) PCT Filed: Dec. 17, 2019

(86) PCT No.: PCT/DE2019/200148
§ 371 (c)(1),
(2) Date: Jun. 18, 2021

(87) PCT Pub. No.: WO2020/125877
PCT Pub. Date: Jun. 25, 2020

(65) Prior Publication Data
US 2022/0038646 A1 Feb. 3, 2022

(30) Foreign Application Priority Data
Dec. 18, 2018 (DE) ...................... 10 2018 221 995.8

(51) Int. Cl.
*H04N 23/60* (2023.01)
*H04N 23/58* (2023.01)
(Continued)

(52) U.S. Cl.
CPC ............. *H04N 23/60* (2023.01); *H04N 23/58* (2023.01); *H04N 23/69* (2023.01);
(Continued)

(58) Field of Classification Search
CPC .... H04N 13/00; H04N 13/02; H04N 13/0282; H04N 13/282; H04N 5/247; H04N 23/60;
(Continued)

(56) References Cited

U.S. PATENT DOCUMENTS

2014/0198184 A1* 7/2014 Stein ...................... G06V 20/56
348/47
2015/0035984 A1 2/2015 Otsuka
(Continued)

FOREIGN PATENT DOCUMENTS

DE 112013001647 T5 12/2014
DE 102014220585 A1 4/2016
(Continued)

OTHER PUBLICATIONS

NPL Search (Jul. 19, 2023).*
(Continued)

*Primary Examiner* — Van T Trieu

(57) ABSTRACT

A camera system and method for controlling same, including capturing images of surroundings of a vehicle for a driver assistance system thereof. The camera system includes a first rolling shutter camera having a first aperture angle, a second rolling shutter camera having a second aperture angle, and control electronics. The first and second cameras are suitable for generating wide-angle and tele camera images, respectively. The first aperture angle is greater than the second aperture angle. The two cameras are designed such that both camera images have an overlap region. The control electronics synchronizes the two cameras. The geometric arrangement of the two cameras with
(Continued)

respect to one another, and the position of the overlap region in the wide-angle image and in the tele camera image, are determined by continuous estimation. The stored geometric arrangement and position are taken into consideration during synchronization of the first and second cameras.

19 Claims, 6 Drawing Sheets

(51) Int. Cl.
*H04N 23/69* (2023.01)
*H04N 23/698* (2023.01)
*H04N 25/40* (2023.01)
*B60R 11/04* (2006.01)

(52) U.S. Cl.
CPC ........... *H04N 23/698* (2023.01); *H04N 25/41* (2023.01); *B60R 11/04* (2013.01); *B60W 2420/403* (2013.01)

(58) Field of Classification Search
CPC ........ H04N 23/69; H04N 23/90; H04N 25/74; B60R 1/00
See application file for complete search history.

(56) References Cited

U.S. PATENT DOCUMENTS

| | | |
|---|---|---|
| 2017/0310952 A1 | 10/2017 | Adomat |
| 2018/0167587 A1 | 6/2018 | Krökel |
| 2019/0166313 A1* | 5/2019 | Furutake .............. H04N 25/531 |
| 2019/0260929 A1* | 8/2019 | Kaneko .................. H04N 5/265 |
| 2022/0279134 A1* | 9/2022 | Yokoyama ............. H04N 23/60 |

FOREIGN PATENT DOCUMENTS

| | | |
|---|---|---|
| WO | 2014111814 A2 | 7/2014 |
| WO | 2016055060 A1 | 4/2016 |
| WO | 2017028848 A1 | 2/2017 |

OTHER PUBLICATIONS

Germany Search Report dated Jun. 25, 2019 for the counterpart German Patent Application No. 10 2018 221 995.8.
International Search Report and the Written Opinion of the International Searching Authority dated Jun. 22, 2020 for the counterpart PCT Application No. PCT/DE2019/200148.

* cited by examiner

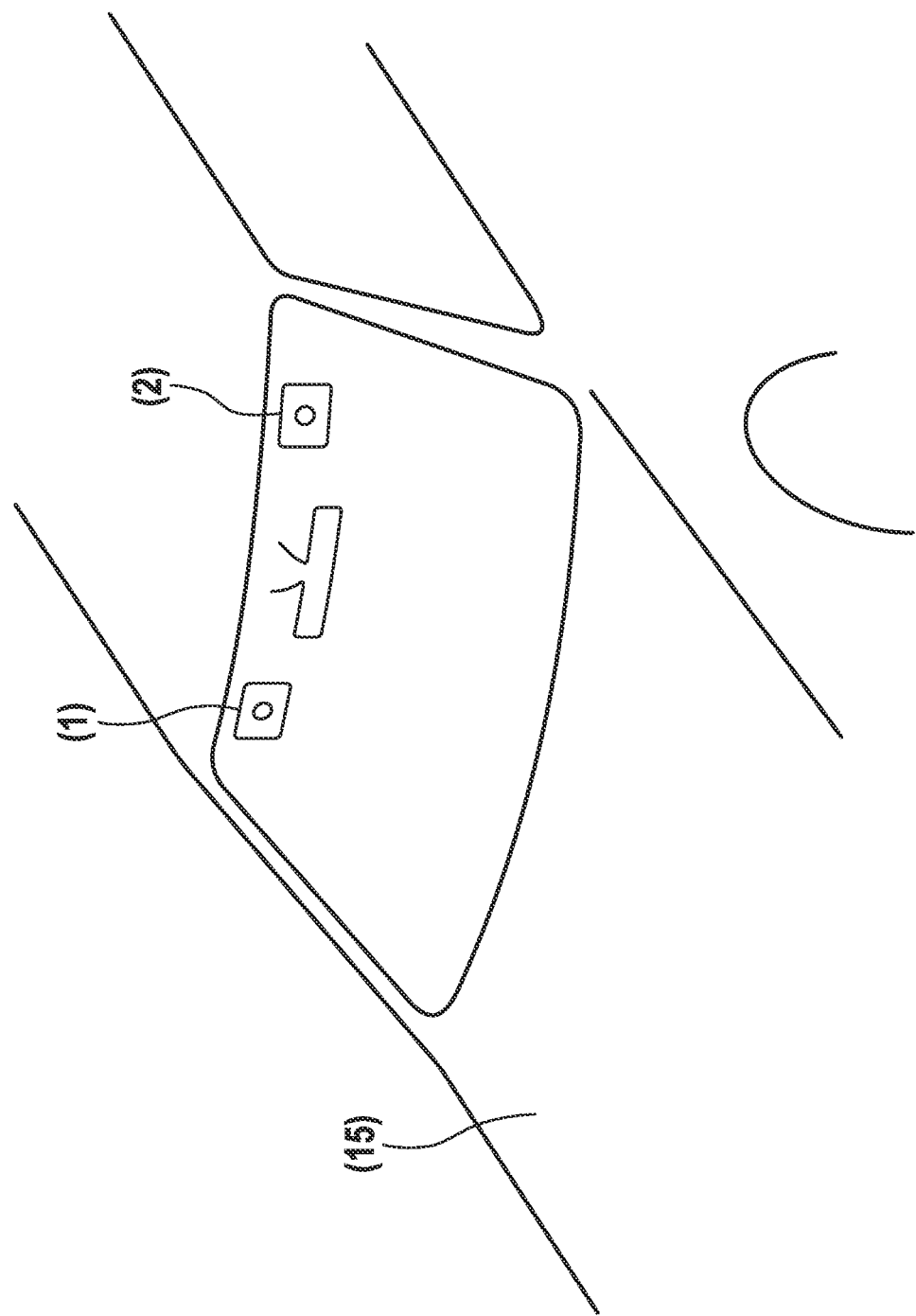

SYNCHRONIZED CAMERA SYSTEM HAVING TWO DIFFERENT CAMERAS

CROSS-REFERENCE TO RELATED APPLICATIONS

This application is a national stage application, filed under 35 U.S.C. § 371, of International Patent Application No. PCT/DE2019/200148, filed on Dec. 17, 2019, which is incorporated by reference herein.

TECHNICAL FIELD

The technical field relates to a camera system for capturing images of the surroundings of a vehicle for a driver assistance system of the vehicle, and to a method for controlling or synchronizing a first and a second camera of the camera system.

BACKGROUND

The spatial reconstruction of scenes in the surroundings and in particular in front of a vehicle is an essential component of many ADAS applications (ADAS=Advanced Driver Assistance Systems, driver assistance systems). Reconstruction methods from simultaneously captured images of two slightly spatially offset cameras have particularly proven themselves.

This approach is known as stereoscopy (or stereo reconstruction) and the relevant vehicle camera systems are becoming increasingly important on the ADAS market. In the case of such camera systems, the spatial geometry of the scene is reconstructed from differences in the position and form of objects (for instance disparity) in the respective camera images by triangulation.

Known stereoscopic systems for ADAS applications realize the relevant camera system as two optics which are mounted virtually parallel in a rigid printed circuit board carrier and have a defined base length as a lateral distance with respect to one another. The stereo camera thus created is frequently installed in a region of the windshield behind the rearview mirror.

Due to the limited space in said installation position, such systems mostly have a relatively small distance (base length) between the optics, as a result of which the precision of the spatial reconstruction of the camera system suffers.

An object of the present invention is to provide an optimized camera system which makes it possible to spatially reconstruct the surroundings of a vehicle in a robust manner.

A starting point of consists of using a camera system, in which the individual cameras are arranged at a great distance and are mechanically coupled loosely from one another. The individual cameras can be referred to as satellite cameras. Satellite systems having different optical properties present a particular challenge, as explained below. When utilizing stereo systems for ADAS applications, the problem is simultaneously exposing the same photosensitive elements (pixels) of the two cameras, which image the same objects. The latter property is essential for an accurate reconstruction since even small differences at the time of the start of exposure can, at high vehicle speeds, result in a considerable offset of the objects in the relevant images and consequently in artifacts during the correspondence finding and in errors in the triangulation. The same applies to the length of the exposure time. Long exposure results in a blurring of images of moving scenes, also known as motion blur. Different exposure times result in different manifestations of the motion blur, which is disadvantageous for finding corresponding image regions.

Using different optics or image sensors thus constitutes a potential problem for applying stereo methods, since, in this case, both the exposure moments and the exposure intervals of the cameras differ. The effects in the case of the rolling shutter method weigh particularly heavily, since the image sensor is, in this case, exposed line by line or pixel by pixel.

One possibility of circumventing the outlined problem consists of exposing all of the photosensitive elements (pixels) of both cameras simultaneously. This technology is known as global shutter. The relevant camera technologies are however expensive and less flexible.

A solution for rolling shutter cameras is described in WO 2014/111814 A2, which discloses a procedure for synchronizing two cameras having a different resolution and aperture angle, so that an acceptable stereo image can be calculated. The proposed synchronization provides that the time control of the cameras is to be adjusted such that the starting point and end point of the joint overlap region of both camera images are exposed simultaneously. Nevertheless, an unwanted residual error remains, which has to be corrected in a complex manner.

DE 10 2014 220 585 A1 and WO 2016/055060 A1 each show a stereo camera for a vehicle having two different (partially) overlapping visual image regions.

WO 2017/028848 A1 shows a vehicle camera device for capturing the surroundings of a motor vehicle, having a first and a second optronic unit. The first and the second optronic units have different image angles and their acquisition regions overlap one another.

An object of the invention is to provide a further improved camera system having improved exposure control.

SUMMARY

A camera system for capturing images of the surroundings of a vehicle for a driver assistance system of the vehicle includes a first rolling shutter camera having a first aperture angle $\alpha$, a second rolling shutter camera having a second aperture angle $\beta$, and control electronics. The first camera is suitable for generating a wide-angle camera image, that is, the first aperture angle $\alpha$ (in particular in the horizontal direction) is greater, e.g., greater than 90 degrees, than the second aperture angle $\beta$, e.g., less than 30 degrees, of the second camera which is suitable for generating a tele camera image. The two cameras are designed in such a way that both camera images have an overlap region.

The control electronics is configured to synchronize the two cameras.

The geometric arrangement of the two cameras with respect to one another, and the position of the overlap region in the wide-angle image and in the tele camera image, are determined by continuous estimation. In other words, the stereo geometry of the system is continually determined. This can take place with standard methods for estimating the stereo geometry. The determined geometric arrangement and position are taken into consideration during synchronization.

Alternatively, the geometric arrangement of the two cameras with respect to one another, and the position of the overlap region in the wide-angle image and in the tele camera image, have been determined by a calibration of the camera system, and information regarding the geometric arrangement and position is saved in a memory (of the camera system).

The stored geometric arrangement and position are taken into consideration during synchronization of the first camera and the second camera of the camera system.

The control electronics should thus expediently access the memory, or the memory should be integrated into the control electronics. The exact type of synchronization can be effected in various ways, taking the geometric arrangement and position into consideration as described in greater detail below. At least two spatial points can be selected, which are thus imaged synchronously in the overlap region by the first and second camera. The pixels of the first and second camera, which acquire or image a spatial point, typically have different sizes; in particular it can be assumed that the spatial region which is imaged by the first (wide-angle) camera on a pixel is imaged by a multiplicity of adjacent pixels of the second (tele) camera. This is decided by the resolution of the cameras in pixels/degree. It can generally be assumed that said resolution is constant for each of the two cameras in the overlap region. Each camera typically has an image sensor or imager. The image sensor comprises pixels arranged line by line and column by column, which can be read out pixel by pixel or line by line.

According to one exemplary embodiment, the control electronics is configured to produce the synchronization in such a manner that a greater line and clock frequency of the first camera predefines the beginning of synchronization and the clock frequency of the second camera in such a manner that (in the overlap region) the exposure of each line of the first camera is begun synchronously with the relevant line of the second camera. The following lines of the second camera, which are still "contained" in the same line of the first camera, are captured in a staggered manner.

The clock for the exposure start points corresponds to the readout clock of an image sensor. Usually, the exposure start point is produced as a readout start point minus the exposure time. A readout clock is referred to below, which designates the clock, with which a pixel is read out, after it has been exposed.

The first camera preferably requires the time $\Delta t\_1$ to read out a line and the second camera requires the time $\Delta t\_1/k$ for a line, wherein k indicates the number of the lines of the second camera, which are contained in one line of the first camera.

The second camera preferably requires the readout time $(k-1)*\Delta t\_1/k$ per line.

According to an advantageous configuration, two pixels of the second camera are predefined inside the overlap region, which pixels are exposed synchronously to the relevant pixels of the first camera.

The start pixel of the first line and the end pixel of the last line of the second camera are each preferably exposed, inside the overlap region for each line of the first camera, synchronously to the relevant start or end pixel of the line of the first camera. This could also be formulated such that the first point to be synchronized "top left" and the second point "bottom right" are each located in one line of the wide-angle camera. An optimal timing for the synchronization is one in which the relevant lines in the overlap region start the reading out (top line of the tele camera) and stop the reading out at the end of the same line of the wide-angle camera and the lowest overlapping line of the tele camera, that is to say both lines, simultaneously.

The second camera (tele camera) has more pixels/degree. The tele camera collects significantly less light per pixel and must therefore generally be exposed for longer than a pixel of the first camera (wide-angle camera).

The image sensor of the first camera preferably exposes with an exposure time b1 and the image sensor of the second camera preferably exposes with the exposure time b2, wherein b2>b1 and the start of exposure of the first camera is delayed by (b2−b1)/2 with respect to the start of exposure of the second camera. As a result, precisely half the exposure time span is synchronized for both cameras. This produces the effect that the motion blur of the (high-resolution) image sensor of the second camera is distributed more evenly over the relevant regions of the (low-resolution) image sensor of the first camera.

The image sensors of the first camera and of the second camera preferably have a comparable number of pixels, in particular the same number of pixels or a number of pixels deviating by less than ten percent. Taking the respective camera lens into consideration, this then produces the resolution of the respective camera in the overlap region.

The resolution of the second camera is particularly advantageously twice the resolution of the first camera, wherein n is a natural number.

According to an embodiment, the geometric arrangement of the two cameras with respect to one another, and the position of the overlap region in the wide-angle image and in the tele camera image, are continuously estimated by means of fundamental matrix estimation. For example, reference is made here to Algorithm 10.3 on p. 269 of "Multiple View Geometry in Computer Vision" by R. Hartley and A. Zisserman, Cambridge Univ. Press, 2000.

A further subject-matter of the invention relates to a method for controlling a camera system for capturing images of the surroundings of a vehicle for a driver assistance system of the vehicle. A first rolling shutter camera has a first aperture angle α, a second rolling shutter camera has a second aperture angle β. The first camera is designed to generate a wide-angle camera image and the second camera is designed to generate a tele camera image. Both camera images have an overlap region.

The geometric arrangement of the two cameras with respect to one another, and the position of the overlap region in the wide-angle image and in the tele camera image, are determined by an estimation or calibration.

The two cameras are synchronized by taking the determined geometric arrangement and position into consideration during synchronization.

An objective is a satellite system for ADAS applications consisting of two cameras aligned virtually parallel and mechanically loosely coupled, wherein the optics have different-sized fields of view. The cameras can be constructed as rolling shutter cameras having a different resolution. A possible implementation of such a system is a combination of a wide-angle camera and a tele camera. Thanks to a clever adjustment of the imager control of both cameras, the discrepancy between the exposure moments of corresponding lines is reduced. Thanks to an existing calibration of the optics, approximately corresponding regions in the images of both systems are determined, wherein an approximately rectangular region of the field of view of one of the optics is determined in the image of the other optics. By matching the sizes of the two regions, a line-by-line or a pixel-by-pixel correction of the exposure moments is determined, which results in a largely simultaneous start of the exposure of corresponding sensor lines.

BRIEF DESCRIPTION OF THE DRAWINGS

Exemplary embodiments are described and explained in greater detail below on the basis of figures, wherein:

FIG. 6 shows a vehicle having a camera system;

DETAILED DESCRIPTION

An exemplary embodiment of a camera system is represented in FIG. 6. The camera system or the camera device includes two cameras (1) and (2) which are arranged mechanically loosely coupled in the space. The two cameras (1) and (2) can be utilized in this configuration in an ADAS system. As represented in FIG. 6, the first camera (1) can be mounted on the right, viewed from the interior, and the second camera (2) can be mounted to the left of the rearview mirror on the windshield of a vehicle (15). The first camera (1) has a wide-angle lens and the second camera (2) has a telephoto lens.

Figure 2:
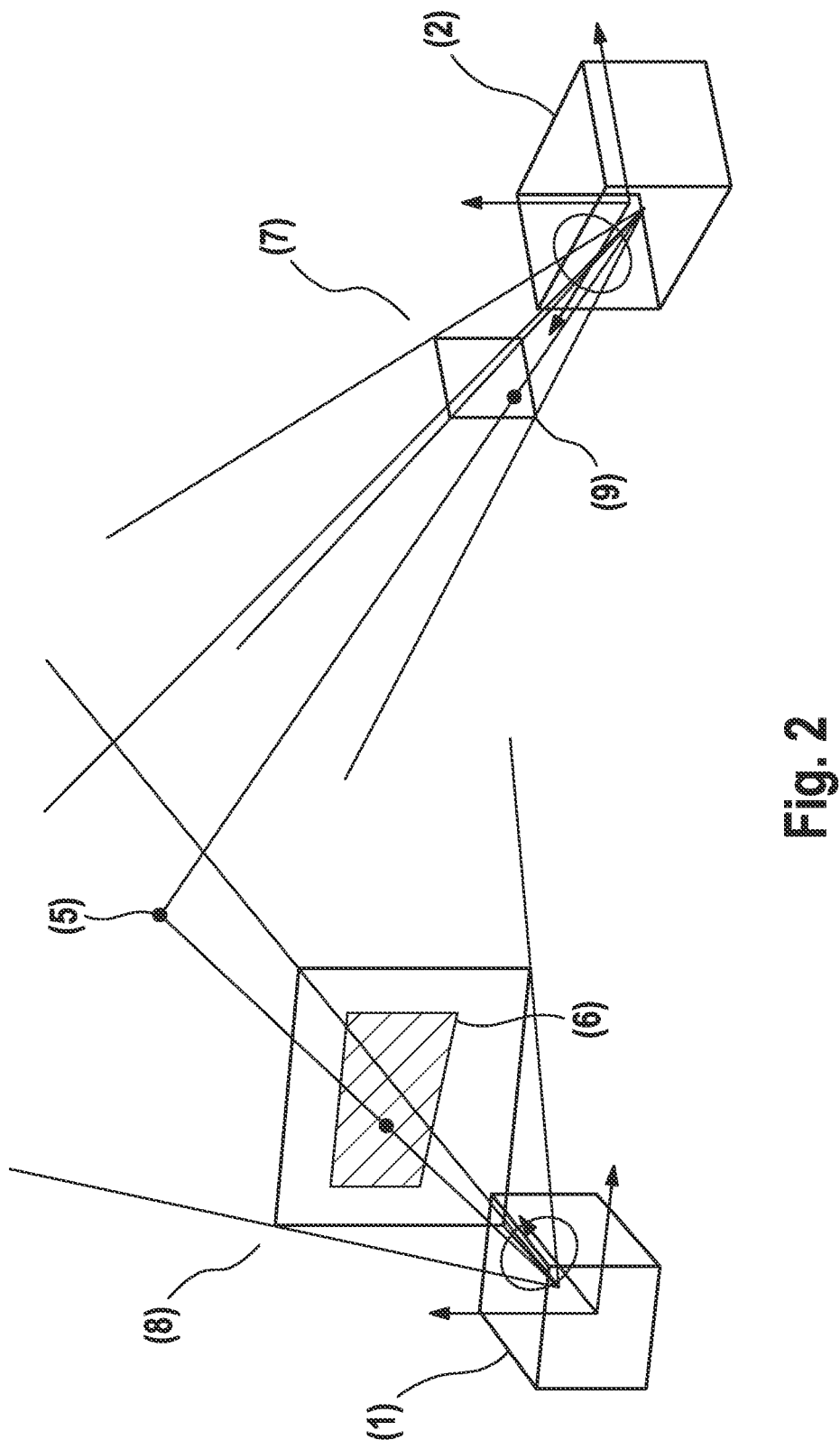
FIG. 2 shows a schematic representation of the fields of vision of the two cameras of the camera system and a projection of the field of vision of the one camera into the image of the other camera.

FIG. 2 schematically represents the relationships between the spatial geometry of the fields of vision of the two cameras (1, 2) and a projection of the field of vision of the second camera (2) into the image of the first camera (1). A spatial point (5) lies in the field of view (8) of the first camera (1) and in the field of view (7) of the second camera (2).

A projection of the spatial point (5) onto a field of view plane of the second camera (2) produces the image (9) of the second camera (2).

In the general case, the projection (9) of the field of view of the second camera (2), intersected with the image of the first camera (1), is a distorted four-sided FIG. 6). Thanks to suitable production processes during the installation of the cameras (1, 2) in the vehicle, it can admittedly be assumed that the cameras (1, 2) are aligned virtually parallel.

Figure 3:
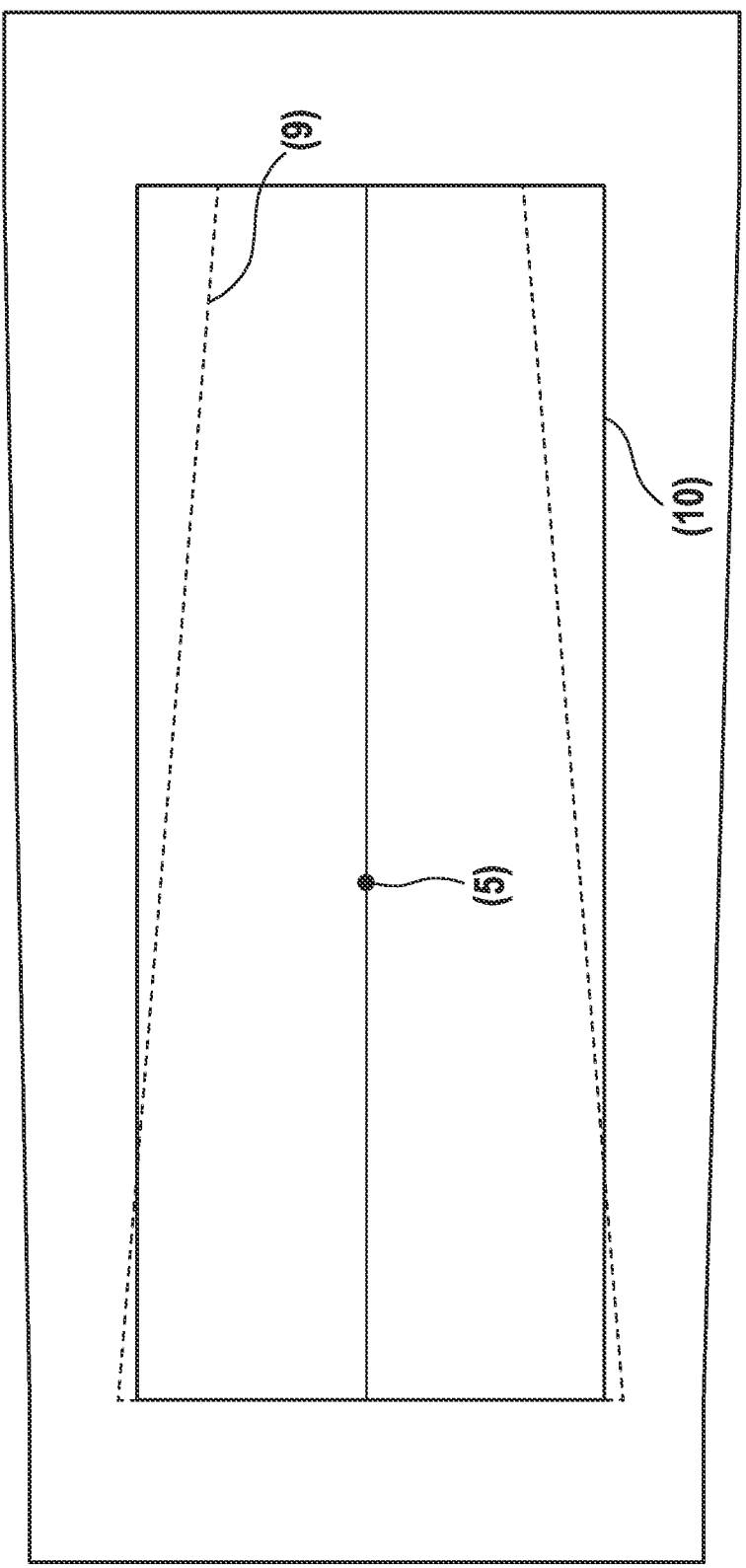
FIG. 3 shows the relation in the image plane between the projection of the field of view of the first camera into the image of the second camera.

FIG. 3 serves to illustrate the relation in the image plane between the projection of the field of view (7) of the second camera (2) into the image (8) of the first camera (1).

In this case, the four-sided FIG. 9) has virtually straight sides and is approximately axially parallel to the image axes of the image of the first camera (1). The latter is indicated by the dashed lines (9) in FIG. 3. The rectangle (10) is now to be interpreted as follows: if a spatial point (5) is located in the field of view of both cameras (1, 2), this is located in the image of the camera (1) in the region (10). The rectangle (10) thus represents, for instance, the overlap region of the fields of view (7, 8) of both cameras (1, 2). The aim of the synchronization is that the line is exposed with the image of each spatial point (5) in the first camera (1) at the same time as the relevant line in the image of the second camera (2). The latter requirement is, extremely generally, only sensible for a parallel camera system without optical distortions. In this case, the respective epipolar lines are parallel.

Figure 1:
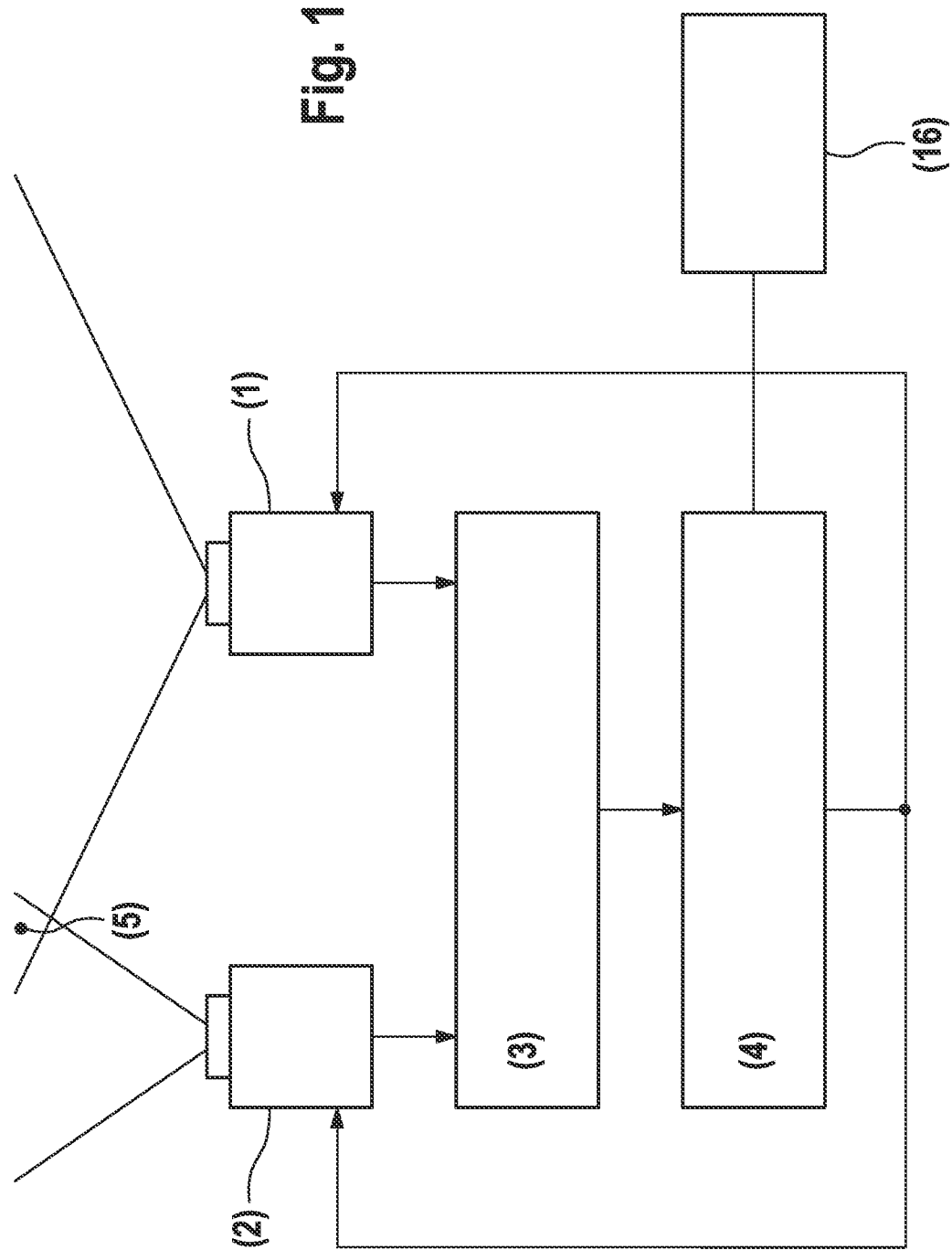
FIG. 1 shows an exemplary embodiment of a method for controlling the camera system (represented schematically)

An exemplary embodiment of a method for controlling the camera system is schematically represented in FIG. 1. A spatial point (5) lies in the overlap region of the first camera (1) and the second camera (2). By an initially roughly adjusted exposure control or imager control (for instance time-synchronous start of the imagers/image sensors), the stereo geometry of the system is determined in an evaluation unit (3) on the basis of the image data acquired by the two cameras (1, 2). This is effected with standard methods for estimating the stereo geometry (for instance fundamental matrix estimation).

The ratio represented in FIGS. 2 and 3 can be estimated by geometric calculations. The calibration information regarding the determined overlap region (10) is forwarded to an imager control (4) and is used there for synchronizing the exposure of both cameras (1, 2). That is, exposure data can be transferred to each of the two cameras (1, 2). The synchronized images acquired by the first camera (1) and second camera (2) are passed to a method (16) for evaluating stereo images. The stereo method (16) determines distance or depth information from the disparity (image displacement) of image features in the overlap region in simultaneously acquired images of the first camera (1) and second camera (2). A semi-global matching (SGM) method can be used as a stereo method (16).

Figure 4:
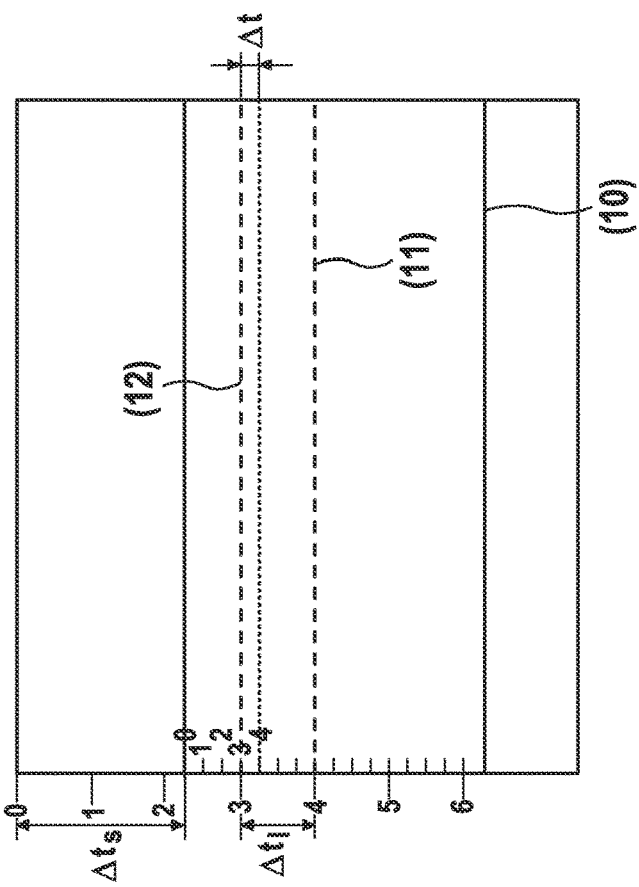
FIG. 4 schematically shows lines of the image sensor of the first camera and of the second camera in an image of the first camera and relevant time intervals.

Relationships are represented in FIG. 4, on the basis of which an exemplary embodiment of the imager control (4) is explained in greater detail. It is assumed that the exposure start clock (the points in time of the start of exposure of each pixel) of the imager of the first camera (1) is known. In FIG. 4, this is represented by the left scale (outside of the framework), which is entered from 0 to 6. The exposure clock of the first camera (1), that is to say the time interval $\Delta t_l$ between the start of exposure of a line (e.g., line 3, top dashed line (12)) and the following line (line 4, bottom dashed line (11)). Knowledge of the position of the first line of the second camera (2) in the image of the first camera (1) produces the temporal offset $\Delta t_s$, by which the second camera (2) should subsequently start the exposure process. The solid rectangle (10) symbolizes the overlap region of the two cameras (1, 2). The lines of the second camera (2) are symbolized by the right scale (inside the framework), which is entered from 0 to 4. This makes it possible to start the exposure of the first line of the second camera (2) at the same time as the relevant, corresponding line of the first camera (1). For the following lines of the second camera (2), the imager control (4) is now adjusted as follows. Assuming that the exposure of the line n has been started in a time-synchronous manner with a rectangular region in the image of the second camera (2), $\Delta t_l$ k lines of the second camera (2) fall into the time between the start of the exposure of the line n and the line n+1 of the first camera (1). In the example of FIG. 4, k=4 for example, that is, four lines of the second camera correspond to one line of the first camera (1).

The difference in the start of exposure of subsequent lines, the exposure start clock, of the second camera (2) is advantageously cut down to the fractional value $\Delta t = \Delta t_l / k$. The exposure start clock corresponds to the readout clock of a line. The second camera (2) therefore has in total a shorter exposure start clock. As a result, the k lines of the second camera (2) start the exposure in the time $\Delta t_l$. Consequently, it follows from this that the line n+1 of the first camera (1) in turn starts simultaneously with the corresponding line of the second camera (2).

The optimized imager control (4) can now be used in order to repeat the method according to FIG. 1 cyclically.

The camera system geometry and, consequently, the imager control (4) can therefore be further adjusted and improved.

Figure 5:
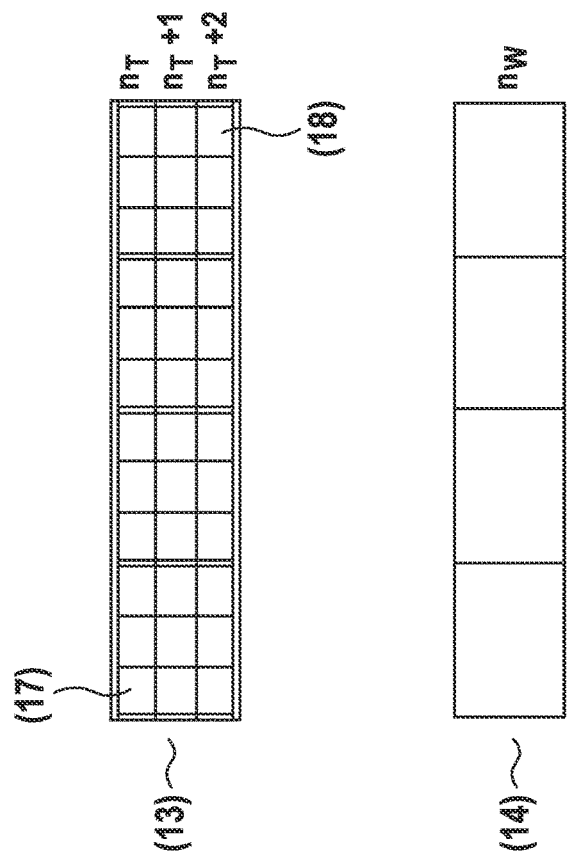
FIG. 5 schematically shows an overlap region of the two cameras having the respective pixels and lines.

An exemplary overlap region of the two cameras (1, 2) is represented schematically in FIG. 5. A pixel of the first camera (1) in a line (14) $n_w$ of the "wide-angle" image sensor "includes" a group of pixels (17) of the second camera (2), as represented in the upper row of lines (13). A pixel of the first camera (1) corresponds to 3×3 pixels of the second camera (2). The line $n_w$ having four pixels of the first camera (1) corresponds to three lines $n_T$, $n_T+1$, $n_T+2$ each having 12 pixels of the "tele" image sensor of the second camera (2).

Inside the overlap region, the start pixel (17) of the first line $n_T$ and the end pixel (18) of the last line $n_T+2$ of the second camera (2) are now each exposed synchronously to the relevant start or end pixels (that is, the first or the fourth pixel, lower line (14) in FIG. 5) of the line $n_w$ of the first camera (1). An optimal timing for the synchronization is one in which the reading out of the first pixel in each case is started (top line of the tele camera), and the reading out of the last pixel in each case (lowest line of the tele camera) is stopped simultaneously.

As a general rule, the second camera (2) has more pixels/degree. It collects significantly less light per pixel and must therefore generally be exposed for longer than a pixel of the first camera (1). Consequently, the second camera (2) exposes object movements over a longer period of time than the first camera (1). The latter results in other (more pronounced) blurring in the image of the second camera (2), in particular due to the motion blur. In order to reduce the motion blur effect for the imaging of the stereo image, the following synchronization can be used in a preferred embodiment. If, for example, the image sensor of the second camera (2) requires an exposure time of b2=10 ms and the image sensor of the first camera (1) only requires b1=1 ms, the image sensor of the first camera (1) could be started with a delay of (b2−b1)/2=4.5 ms. The motion blur of the image sensor of the second camera (2) would therefore be distributed more uniformly among relevant regions of the image sensor of the first camera (1) and an error in the calculation of the stereo image is decreased.

Consequently, the respective imager control (4) allows a suitable synchronization for two cameras (1, 2) having different fields of view.

Results from camera calibration methods are cleverly utilized in order to indicate a passage of time for the exposure, which seeks to minimize the temporal differences in the exposure of corresponding world points (5).

Figure 7:
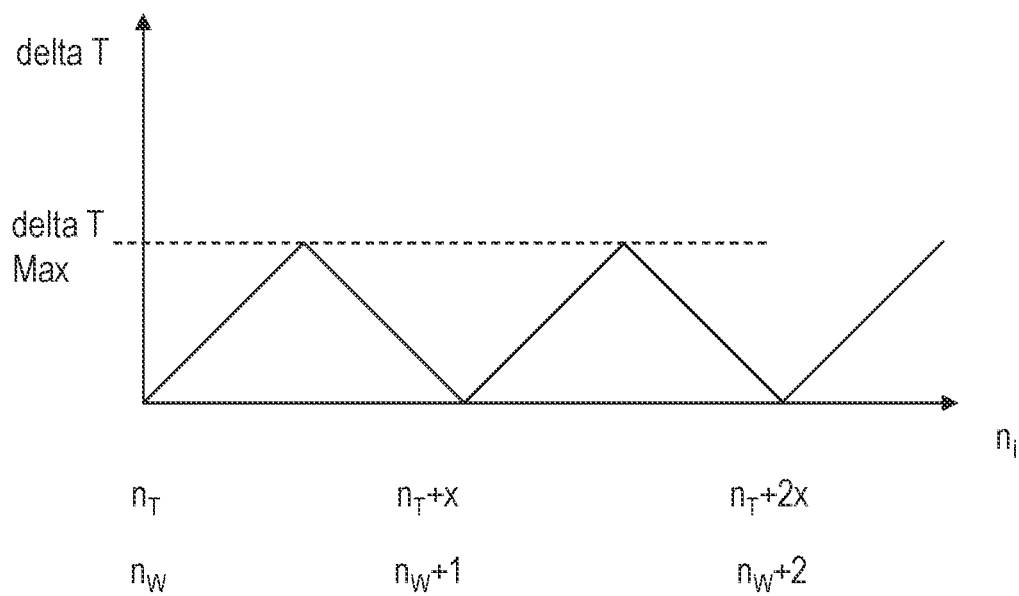
FIG. 7 shows a first course of the time offset delta T over the line numbers.

It can be ensured with the method described above that the exposure takes place simultaneously at the start and end of the overlap region (first and last pixel or line). Moreover, it is ensured that, at the beginning of the exposure of a line of the wide-angle camera, there is synchronicity with the 1st relevant line of the tele camera. The further lines of the tele camera, which also correspond to the relevant line of the wide-angle camera, diverge in synchronicity in order to then converge at the beginning of the next line of the wide-angle camera with the tele camera. This is illustrated by FIG. 5 and the very schematic representation of the temporal offset delta T over the image sensor lines $n_i$ in FIG. 7. The exposure of each line $n_w$, $n_w+1$, $n_w+2$, ... of the first camera (1) is begun synchronously with the relevant line $n_T$, $n_T+x$, $n_T+2x$, ... of the second camera (2). The variable x is intended to mean that an integral ratio k of lines of the second camera (2) does not always have to be located in one line of the first camera (1).

Figure 8:
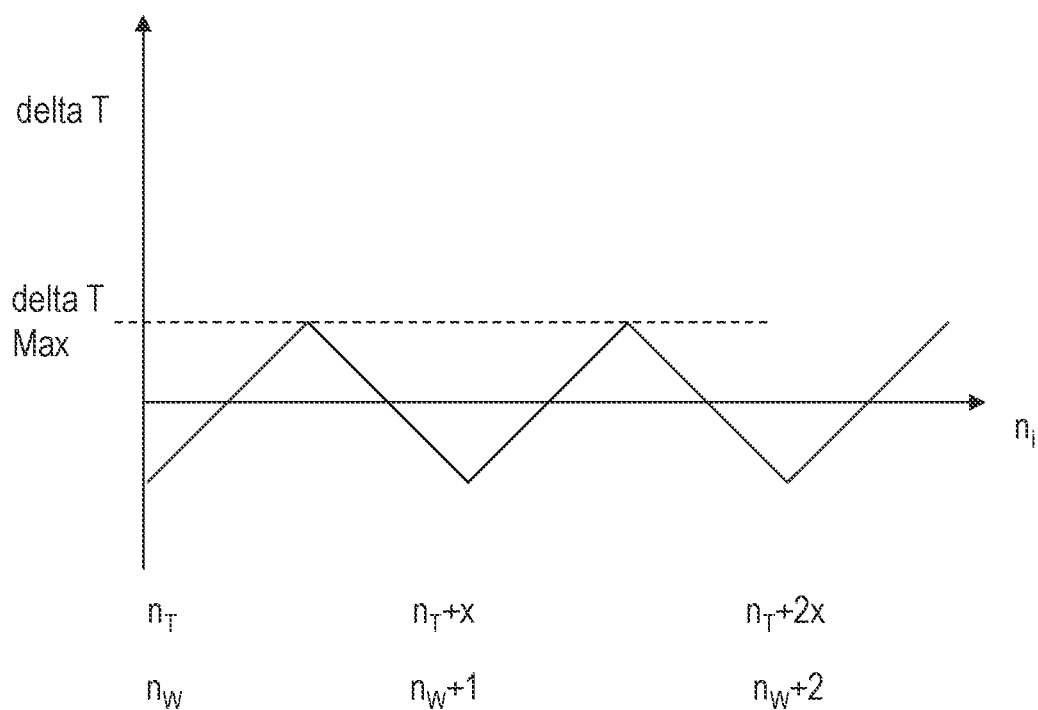
FIG. 8 shows a second course of the time offset delta T over the line numbers.

A further optional improvement in the synchronicity of the capturing consists of again delaying the start of capturing of the tele camera with respect to the wide-angle camera by half the line clock of the wide-angle camera, as a result of which the maximum asynchronicity delta T max is again halved. The very schematic representation in FIG. 8 illustrates this.

The invention claimed is:

1. A camera system for capturing images of the surroundings of a vehicle for a driver assistance system of the vehicle, the camera system comprising:
    a first rolling shutter camera having a first aperture angle;
    a second rolling shutter camera having a second aperture angle;
    wherein the first camera is configured to generate a wide-angle camera image and the second camera is designed to generate a tele camera image such that an overlap region exists among the camera images; and
    control electronics configured to synchronize the two cameras;
    wherein a geometric arrangement of the two cameras with respect to one another and a position of the overlap region are determined by continuous estimation; and
    wherein the determined geometric arrangement and position are taken into consideration during synchronization;
    wherein the control electronic is configured to produce the synchronization in such a manner that a greater line geometry of the first camera predefines the beginning of synchronization and a clock frequency of the second camera in such a manner that the exposure of each line of the first camera is begun synchronously with the relevant line of the second camera.

2. The camera system according to claim 1, wherein the first camera captures per line $n_w$ with a readout clock $\Delta t_l$ and the second camera captures per line $n_T$ with the readout clock $\Delta t_l/k$, wherein k indicates the number of the lines $n_T$, $n_T+1$, ..., $n_T+(k-1)$ of the second camera which are contained in one line $n_w$ of the first camera.

3. The camera system according to claim 2, wherein at least two pixels of the second camera are predefined inside the overlap region and are exposed synchronously to the relevant pixels of the first camera.

4. The camera system according to claim 3, wherein a start pixel of the first line and an end pixel of the last line of the second camera are each exposed, inside the overlap region for each line of the first camera, synchronously to a relevant start and end pixel of the line of the first camera.

5. The camera system according claim 1, wherein the image sensor of the first camera is exposed with an exposure time b1 and the image sensor of the second camera is exposed with exposure time b2, wherein b2>b1, and the start of exposure of the first camera is delayed by (b2−b1)/2 with respect to the start of exposure of the second camera.

6. The camera system according to claim 5, wherein the start of capturing of the second camera is delayed by half a line clock $\Delta t_l$ of the first camera with respect to the first camera inside the overlap region.

7. The camera system according to claim 1, wherein the image sensors of the first camera and the second camera have a comparable number of pixels.

8. The camera system according to claim 1, wherein the resolution of the second camera is twice the resolution of the first camera in the overlap region, wherein n is a natural number.

9. The camera system according to claim 1, wherein the geometric arrangement of the two cameras with respect to one another and the position of the overlap region is continuously estimated by utilizing a fundamental matrix estimation.

10. A method for controlling a camera system for capturing images of the surroundings of a vehicle for a driver assistance system of the vehicle, wherein a first rolling shutter camera has a first aperture angle and a second rolling shutter camera has a second aperture angle, wherein the first camera is configured to generate a wide-angle camera image and the second camera is configured to generate a tele camera image such an overlap region exists among the camera images, said method comprising:
- determining, by control electronics, the geometric arrangement of the two cameras with respect to one another, and the position of the overlap region in the wide-angle image and in the tele camera image by continuous estimation; and
- synchronizing, by the control electronics, the two cameras including considering the determined geometric arrangement and position,
- wherein the first camera captures per line $n_w$ with a readout clock $\Delta t_l$ and the second camera captures per line $n_T$ with the readout $\Delta t_l/k$, wherein k indicates the number of the lines $n_T$, $n_T+1$, ... $n_T+(k-1)$ of the second camera which are contained in one line $n_w$ of the first camera.

11. The method according to claim 10, wherein the control electronics is configured to produce the synchronization in such a manner that a greater line geometry of the first camera predefines the beginning of synchronization and the clock frequency of the second camera in such a manner that the exposure of each line of the first camera is begun synchronously with the relevant line of the second camera.

12. The method according to claim 10, wherein two pixels of the second camera are predefined inside the overlap region and are exposed synchronously to the relevant pixels of the first camera.

13. The method according to claim 12, wherein a start pixel of the first line and an end pixel of the last line of the second camera are each exposed, inside the overlap region for each line of the first camera, synchronously to a relevant start and end pixel of the line of the first camera.

14. The method according claim 10, wherein the image sensor of the first camera exposes with an exposure time b1 and the image sensor of the second camera exposes with the exposure time b2, wherein b2>b1, and the start of exposure of the first camera is delayed by (b2−b1)/2 with respect to the start of exposure of the second camera.

15. The method according to claim 14, wherein the start of capturing of the second camera is delayed by half a line clock $\Delta t_l$ of the first camera with respect to the first camera inside the overlap region.

16. The method according to claim 10, wherein the image sensors of the first camera and the second camera have a comparable number of pixels.

17. The method according to claim 10, wherein the resolution of the second camera is twice the resolution of the first camera in the overlap region, wherein n is a natural number.

18. The method according to claim 10, wherein the geometric arrangement of the two cameras with respect to one another and the position of the overlap region is continuously estimated by utilizing a fundamental matrix estimation.

19. A camera system for capturing images of the surroundings of a vehicle for a driver assistance system of the vehicle, the camera system comprising:
- a first rolling shutter camera having a first aperture angle;
- a second rolling shutter camera having a second aperture angle;
- wherein the first camera is configured to generate a wide-angle camera image and the second camera is designed to generate a tele camera image such that an overlap region exists among the camera images; and
- control electronics configured to synchronize the two cameras;
- wherein a geometric arrangement of the two cameras with respect to one another and a position of the overlap region are determined by continuous estimation,
- wherein the determined geometric arrangement and position are taken into consideration during synchronization, and
- wherein the image sensor of the first camera is exposed with an exposure time b1 and the image sensor of the second camera is exposed with exposure time b2, wherein b2>b1, and the start of exposure of the first camera is delayed by (b2−b1)/2 with respect to the start of exposure of the second camera.

* * * * *